United States Patent
Cecil et al.

(10) Patent No.: US 9,523,777 B2
(45) Date of Patent: Dec. 20, 2016

(54) THERMAL KINETIC INDUCTANCE DETECTOR

(71) Applicant: UChicago Argonne, LLC, Argonne, IL (US)

(72) Inventors: Thomas Cecil, Darien, IL (US); Lisa Gades, Aurora, IL (US); Antonio Miceli, Chicago, IL (US); Orlando Quaranta, Chicago, IL (US)

(73) Assignee: UChicago Argonne, LLC, Chicago, IL (US)

( * ) Notice: Subject to any disclaimer, the term of this patent is extended or adjusted under 35 U.S.C. 154(b) by 260 days.

(21) Appl. No.: 14/250,083

(22) Filed: Apr. 10, 2014

(65) Prior Publication Data

US 2015/0293236 A1    Oct. 15, 2015

(51) Int. Cl.
*H01L 27/18*      (2006.01)
*G01T 1/16*      (2006.01)

(52) U.S. Cl.
CPC ................ *G01T 1/1606* (2013.01)

(58) Field of Classification Search
CPC .......... H01L 39/02; H01L 39/24; H01L 39/10
USPC ..................................... 250/336.2
See application file for complete search history.

(56) References Cited

U.S. PATENT DOCUMENTS

| | | | |
|---|---|---|---|
| 4,869,598 A * | 9/1989 | McDonald | G01K 7/006 250/336.2 |
| 4,962,316 A | 10/1990 | Jack | |
| 5,090,819 A * | 2/1992 | Kapitulnik | G01J 5/20 250/336.2 |
| 6,576,904 B1 * | 6/2003 | Volkening | G01J 5/20 250/338.1 |
| 6,726,356 B2 * | 4/2004 | Tanaka | G01K 17/00 374/10 |
| 6,907,359 B2 * | 6/2005 | Tanaka | G01K 17/00 250/336.2 |
| 2004/0161628 A1 * | 8/2004 | Gupta | B23P 6/007 428/633 |
| 2010/0019152 A1 * | 1/2010 | Tanaka | G01T 1/26 250/336.2 |
| 2010/0304977 A1 * | 12/2010 | Sadleir | G01K 3/005 505/470 |
| 2011/0064191 A1 * | 3/2011 | Toth | G01N 23/20033 378/53 |
| 2012/0065072 A1 * | 3/2012 | Hays | G01R 33/035 505/162 |
| 2012/0187274 A1 * | 7/2012 | Kurakado | G01T 1/1606 250/200 |
| 2013/0029848 A1 * | 1/2013 | Gonzalez | G06N 99/002 505/210 |

OTHER PUBLICATIONS

Author: Antonino Miceli, Title: Microwave Kinetic Inductance Detectors for X-ray Science, Date: Apr. 24, 2012, publisher: Argonne.*

(Continued)

*Primary Examiner* — David J Makiya
*Assistant Examiner* — Taeho Jo
(74) *Attorney, Agent, or Firm* — Foley & Lardner LLP

(57) ABSTRACT

A microcalorimeter for radiation detection that uses superconducting kinetic inductance resonators as the thermometers. The detector is frequency-multiplexed which enables detector systems with a large number of pixels.

20 Claims, 10 Drawing Sheets

(56) References Cited

OTHER PUBLICATIONS

Author: Antonino Miceli, Title: Development of Superconducting Detectors for X-ray Science, Date: Aug. 22, 2011, publisher: Argonne.*

Author: T. Cecil et al., Title: Kinetic Inductance Detectors for X-Ray Spectroscopy, Date: 2012, publisher: y Elsevier Ltd. Selection and/or peer-review under responsibility of the organizing committee for TIPP 11.*

Author: Jochem Baselmans., Title: Kinetic Inductance Detectors, Date: Oct. 18, 2011, publisher: Journal of Low Temperature Physics 167, Nos. 3-4, 292-304, (2012).*

Author: G Vardulakis et al., TitleSuperconducting kinetic inductance detectors for astrophysics, Date: Dec. 17, 2007, publisher: IOP Publishing.*

Ulbricht, et al., Highly multiplexible thermal kinetic inductance detectors for x-ray imaging spectroscopy, Applied Physics Letters vol. 106, 251103, Jun. 25, 2015, 4 pages.

Lindeman, et al., "AC Bolometer Theory and Measurements of Kinetic Inductance Bolometer-Resonators," Journal of Low Temperature Physics, Jan. 23, 2014, 7 pages.

Lindeman, et al., "Model of superconducting alternating current bolometers," Journal of Applied Physics, Feb. 2013, vol. 113, No. 074502, 9 pages.

McDonald, D.G., Novel superconducting thermometer for bolometric applications, Applied Physics Letters, Mar. 23, 1987, vol. 50 No. 12, pp. 775-777.

Rawley, et al. "Progress in kinetic inductance thermometeres for x-ray calorimeters," SPIE, 1989, vol. 1159, pp. 414-422.

Vercruyssen, et al., "Substrate-dependent quasiparticle recombination time in superconducting resonators," Applied Physics Letters, 2011, vol. 99, No. 062509, 4 pages.

Zmuidzinas, J., "Superconducting Microresonators: Physics and Applications," Annual Review of Condensed Matter Physics, 2012, vol. 3, pp. 169-214.

* cited by examiner

THERMAL KINETIC INDUCTANCE DETECTOR

STATEMENT OF GOVERNMENT INTEREST

The United States Government has rights in the invention described herein pursuant to Contract No. DE-AC02-06CH11357 between the United States Department of Energy and UChicago Argonne, LLC, as operator of Argonne National Laboratory.

FIELD OF THE INVENTION

The present invention generally relates to radiation detection, particularly x-ray or particle detection, using superconducting kinetic inductance resonators as thermometers in a microcalorimeter

BACKGROUND OF THE INVENTION

Detection and measurement of radiation (photons and particles) are critical to many scientific and industrial applications. Although the present invention can be used for radiation detection in general, the following discussion relates primarily to x-ray detection.

The measurement of the energy of radiation is particularly of interest for many scientific and industrial applications, such as x-ray fluorescence (XRF) microanalysis. XRF microanalysis can be used for elemental and chemical analysis. For example XRF microanalysis is used for the detection and spatial imaging of defects in semiconductor materials. XRF microanalysis can be performed using a range of sources, including electron beams (e.g., scanning electron microscopes), x-ray beams (e.g., synchrotron or x-ray generators), and ion beams (e.g., particle induced X-ray emission (PIXE)).

The most commonly used detectors for XRF microanalysis are semiconductor-based (e.g., Silicon and Germanium). The energy resolution of current state-of-the-art x-ray detectors based on Si or Ge have reached their fundamental energy resolutions of ~100 eV at 6 keV. The energy resolution of these detectors is limited by the counting statistics (Fano noise limit) implied by the large size of the semiconductor energy gap (i.e., the electron-hole pair excitation energy, a few electron volts). This resolution severely limits the range of information that can be gained from XRF microanalysis. For example, XRF microanalysis is used to map the two-dimensional distribution of metals in modern integrated circuit (IC) chips. However, these modern IC chips use heavy metals (e.g., Er, Hf, Ta, Tb, Tm), in addition to the typical metals (e.g., Ti, Cu, Mo, Pd, Ag, In). The L-edge fluorescence lines of these heavy metals overlap with the K-edge fluorescence lines of the typical metals. Thus, detectors with an energy resolution <50 eV are desirable for XRF microanalysis of modern integrated circuits.

As an alternative to semiconductor-based detectors, superconductors have energy gaps that are roughly three orders of magnitude smaller than semiconductors. In a device called a microwave kinetic inductance detector (MKID) a superconducting thin film is patterned into an electrical resonator (Day, P. K., LeDuc, H. G., Mazin, B. A. Vayonakis, A. & Zmuidzinas, J. "A broadband superconducting detector suitable for use in large arrays". Nature 425, 817-821 (2003)). The operating temperature of these detectors is below ~1 K. The inductance of the superconductor varies as a function of the number of quasiparticles (charge carriers). When the superconductor absorbs a photon, Cooper pairs break apart creating excess quasiparticles. The number of Cooper pairs that break (and number of excess quasiparticles created) is a function of photon energy and the superconductor energy gap. This detection mechanism is non-equilibrium or athermal (i.e., the detector temperature does not change). The increase in quasiparticles alters the inductance of the resonator and thus the resonance frequency. This change in resonance frequency can be measured as the change in the phase and amplitude of a microwave signal transmitted past the resonator and can be correlated to the photon energy. While these devices typically operate more slowly than semiconductor devices, they are naturally frequency-multiplexable by designing each pixel (superconducting resonator) to have a different resonance frequency and coupling the resonators to a single microwave feed line. The ability to multiplex is a key design consideration for very low temperature detector systems. The limited cooling capacity at very low temperatures calls for limiting the number of wires or cables from room temperature to the detector. The ability to readout multiple pixels on a single wire or cable is highly desirable for very low temperature detectors; this is often referred to as the multiplexing factor. Many applications require large pixel counts for imaging or count rate requirements. MKID arrays of approximately 2000 pixels have been deployed and arrays with 10,000 pixels are being designed today.

An alternate method for x-ray detection is a microcalorimeter. A microcalorimeter does not count charge carriers, but measures a change in temperature. A microcalorimeter consists of an absorber with a weak thermal link to a heat bath and a sensitive thermometer. When a photon is absorbed, the temperature of the absorber increases by an amount determined by the photon energy and the absorber heat capacity. The thermometer measures the temperature rise. The ultimate resolution of such a device is determined by the sensitivity of the thermometer and the thermal fluctuations over the weak thermal link, not counting statistics. The energy resolution increases with decreasing operating temperature. One such device is a superconducting transition edge sensor, which relies on the sharp transition with temperature between the superconducting and normal state (USPTO U.S. Pat. No. 5,880,468).

MKIDs suffer from the same Fano noise limits as the semiconductor devices. While their resolution will be better than semiconductor devices due to the lower energy gap, for applications with x-ray photons they suffer from other issues such as background signal due to substrate absorption and low stopping power, which limits overall efficiency.

While superconducting microcalorimeters (e.g., using transition edge sensors as the thermometer) have achieved good energy resolution (~1 eV), they employ complex low temperature electronics (SQUIDs) that limit the number of pixels in the detector and thus overall solid angle and total count rate.

SUMMARY OF THE INVENTION

One implementation of the invention relates to a thermal kinetic inductance device for x-ray detection. The device comprises a superconducting inductor with thermally variable inductance thermally isolated from a heat bath. An x-ray absorber is in thermal contact with the inductor via an energy mediating layer. A capacitor is in electrical communication with the superconducting inductor. The capacitor and inductor form a resonant circuit.

Another implementation of the invention relates to an apparatus for x-ray detection. A thermal kinetic inductance device is included. Apparatus also includes a cryostat with operating temperature near 0.1 K, a microwave synthesizer, a low noise amplifier, a plurality of IQ mixers, a digitizer, and variable attenuators.

Another implementation of the invention relates to a method for fabricating a thermal kinetic inductance detector. A micrometer SiN membrane is fabricated on a micrometer Silicon wafer. The resonator is fabricated by deposition, lithography, then etch. A resist strip is provided. The absorber is fabricated by lithography, followed by deposition and liftoff. SiN bridge lithography is performed with backside SiN membrane lithography and backside Silicon etch. Then a protective coating of Al is deposited on the backside. The SiN bridge is etched and an Al wet etch performed. Finally, a resist strip.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 8A illustrating the resultant structure and FIG. 8B illustrating the comparative noise data.

DETAILED DESCRIPTION OF THE PREFERRED EMBODIMENTS

Figure 1A:
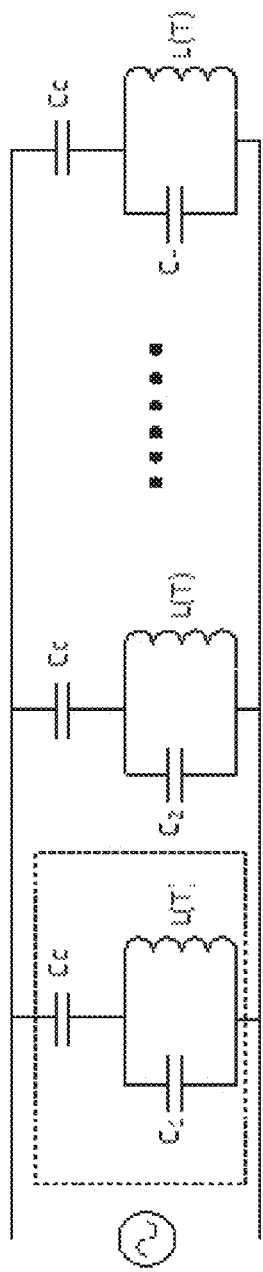
FIG. 1(a) An electrical circuit diagram of the thermal kinetic inductance detector (TKID) showing several TKIDs coupled to a single microwave transmission line. The dashed black box circles a single TKID showing the thermally variable inductance, LC resonant circuit, and capacitive coupling to a microwave feedline. 1(b) Thermal circuit diagram of the device showing dominant thermal conductances. The electron-phonon couplings and electronic heat conductance through the inductor are not shown. While the absorber and resonator are shown thermally separated by the SiN, they can be in intimate thermal contact without altering the description herein. 1(c) A false-color micrograph of the tantalum device. The lumped element resonator is fabricated lithographically from a 100 nm thick WSi2 film (gray). The interdigitated capacitor (IDC) portion is on solid SiN/Si substrate (500 nm/300 μm), while the inductive meander lies on a suspended SiN membrane. The meander encircles the absorber. The coplanar waveguide (CPW) feedline and the ground plane are also shown This is one pixel.
Figure 1B:
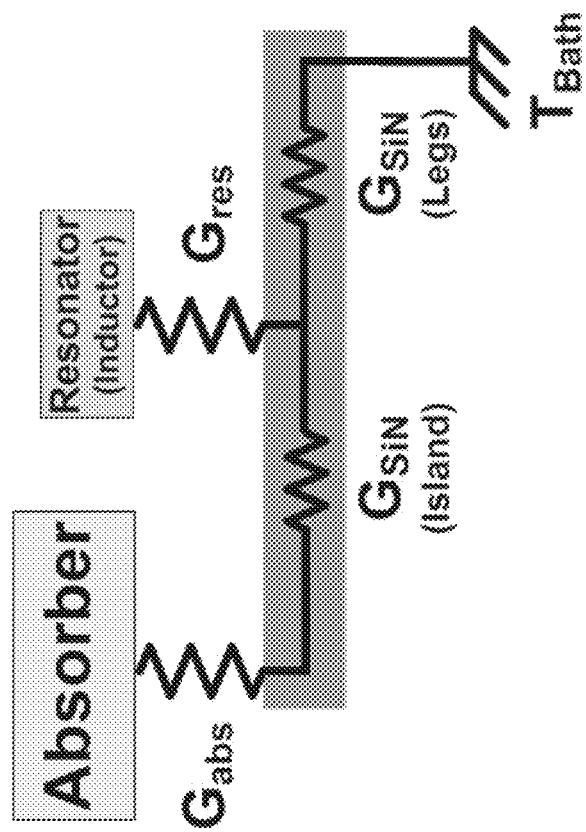

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

XRF microanalysis is used on scanning electron microscopes (SEM) and x-ray synchrotrons. This requires detectors to perform elemental and chemical mapping. Described herein are devices and methods that offer the sensitivity of a microcalorimeter, along with the natural frequency-multiplexing of a non-equilibrium MKID.

Superconducting resonators have to date been used for photon detection in a non-equilibrium manner. However, described herein are devices that can also be used in a thermal equilibrium manner to detect X-ray photons. A resonator is used to measure the temperature rise induced by an X-ray photon absorbed in normal metal and superconducting absorbers on continuous and perforated silicon nitride membranes. The resonator is electromagnetically coupled to a microwave transmission line. The temperature rise is measured as a change in the phase and amplitude of a microwave probe signal transmitted past the resonator on the transmission line. Multiple resonators, each with a different resonance frequency, can be coupled to a single transmission line and read out using multiple probe signals tuned to match the frequencies of the resonators.

The response of a superconductor is nearly identical to either an excessive non-equilibrium quasiparticle population from photon absorption or an increase in equilibrium thermal quasiparticle population due to a temperature change (J. Gao, The Physics of Superconducting Microwave Resonators, California Institute of Technology, 2008.). This equivalence enables the use of a superconducting resonator as a sensitive thermometer and to detect x-ray photons in a thermal equilibrium manner (i.e., a microcalorimeter). Implementations described herein are based upon this thermal equilibrium photon detection mechanism.

As described further herein, certain implementations of a device uses a superconducting resonator in the lumped element form with the inductive meander shaped to encircle an absorber on a suspended SiN membrane. The electrical circuit diagram is shown in FIG. 1(a). In contrast to non-equilibrium x-ray MKIDs, the resonator and absorber are not in direct electrical contact. Energy flow between the resonator and absorber is mediated by the phonons in the SiN membrane. The lumped element resonator design allows one to separate the inductor (i.e., the active part of the resonator) from the capacitor. While the inductive meander is shaped to encircle the absorber on the SiN membrane, the interdigitated capacitor (IDC) is off the membrane on the solid wafer, capacitively coupled to the feedline.

Figure 1C:
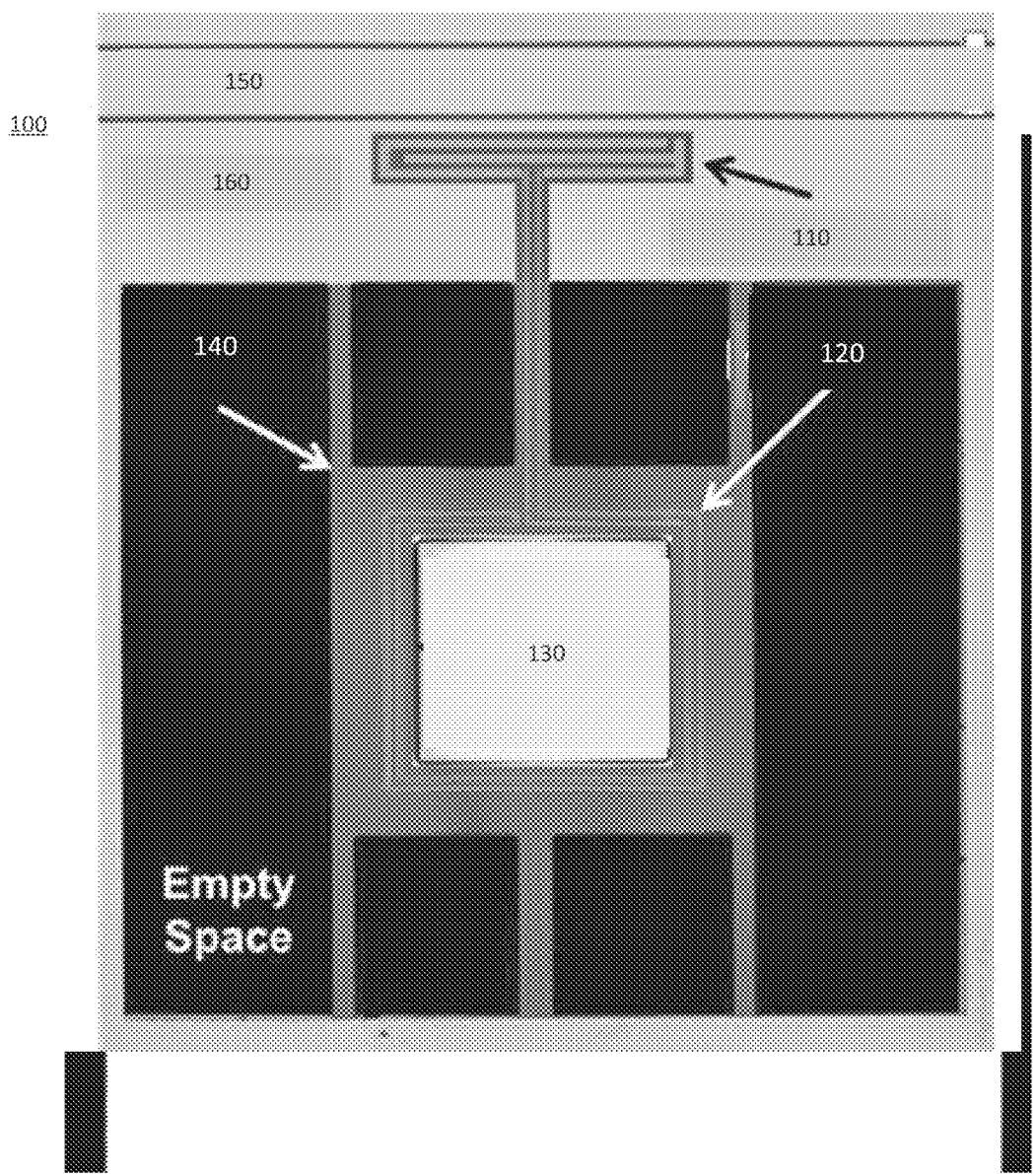

FIG. 1(c) illustrates the structure of one embodiment, shown as a false-color micrograph of a tantalum device. The lumped element resonator 100 is fabricated lithographically from a 100 nm thick WSi2 film (gray). The interdigitated capacitor (IDC) portion 110 is on solid SiN/Si substrate (500 nm/300 μm), while the inductive meander 120 lies on a suspended SiN membrane 140. The meander 120 encircles the absorber 130. The coplanar waveguide (CPW) feedline 150 and the ground plane 160 are also shown.

Several configurations have been fabricated with several configurations of the absorber and the SiN membrane. In all of the fabricated devices, the resonator is a single layer of 100 nm thick tungsten silicide (WSi2 Tc≈1.3 K) on a 500 nm thick SiN suspended membrane. One device has a 300×300× 0.5 μm3 tantalum absorber (tantalum-300) with a 10 nm thick niobium seed layer. In this implementation, the device lies on the SiN membrane perforated to form an island (FIG. 1(c)) supported by six legs. The other two devices have 100 nm thick gold absorbers on a continuous, un-perforated SiN membrane (not shown). On the same chip, the gold devices consist of two areas, 300×300 μm2 (gold-300) and 200×200 μm2 (gold-200), in addition to devices with no absorber present. The WSi2 is deposited by DC magnetron sputtering from a stoichiometric target and the resonator is patterned with a dry etch. The absorbers are patterned via liftoff. A KOH wet etch is used to etch through the 300 μm thick high-resistivity (>5 kΩ cm) Si wafer and release the continuous suspended SiN membrane. The tantalum-300 device has an additional dry etch to form the island and legs. The characteristics of the three types of devices presented here are summarized in table 1.

TABLE 1

Characteristic Parameters of devices

| Name | Absorber material | Absorber Lateral Dim. (μm²) | Absorber thickness (nm) | SiN membrane type |
|---|---|---|---|---|
| Tantalium-300 | Ta | 300 × 300 | 500 | Island with legs |
| Gold-300 | Au | 300 × 300 | 100 | Continuous |
| Gold-200 | Au | 200 × 200 | 100 | continuous |

Figure 6A:
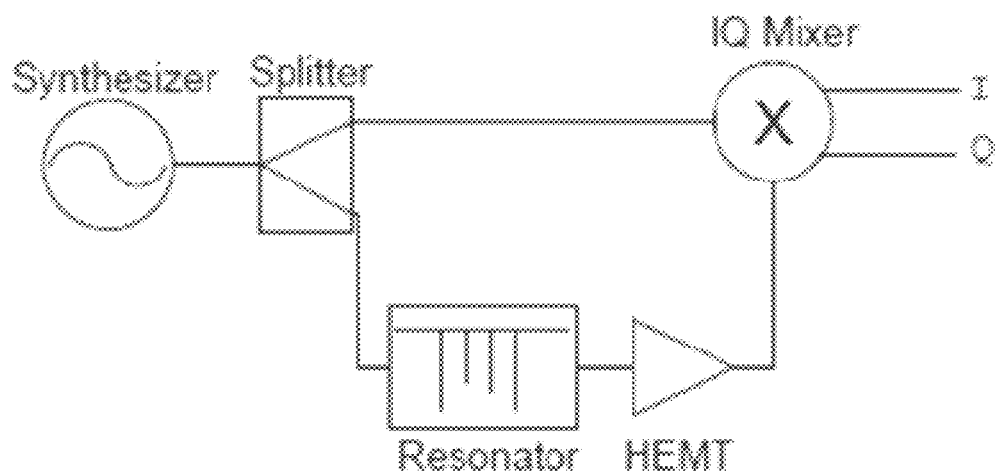
FIG. 6A illustrates one implementation for single pixel readout.
Figure 6:
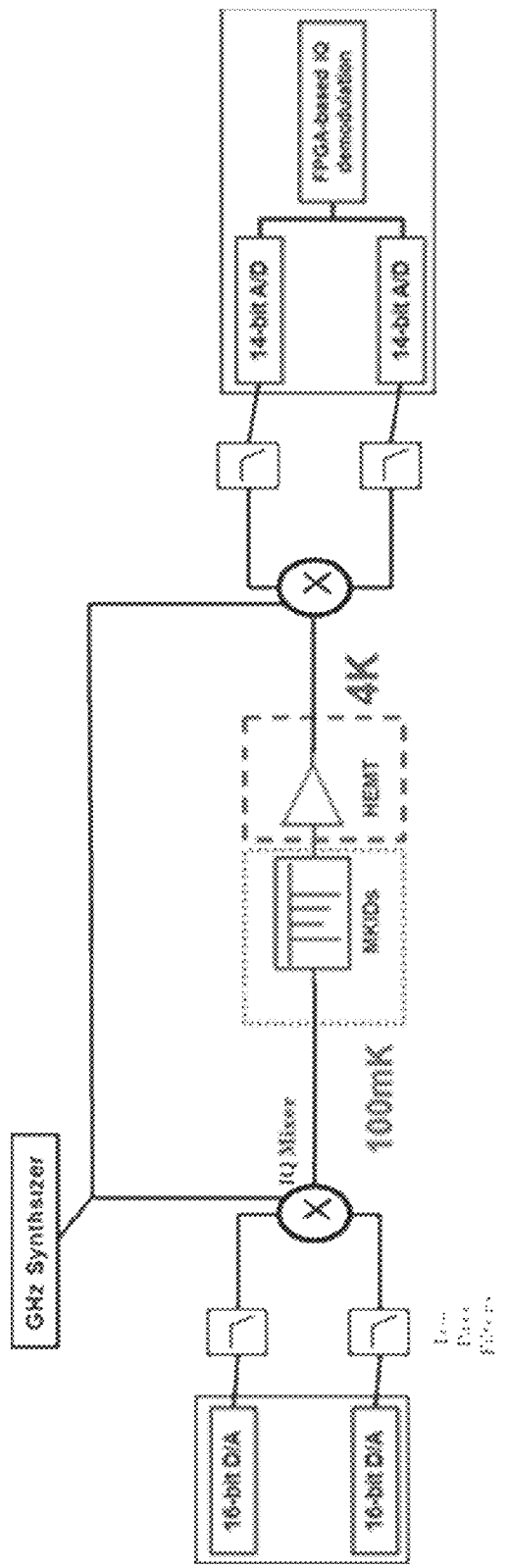
FIG. 6B illustrates a multiple pixel readout using software defined radio.
Figure 7:
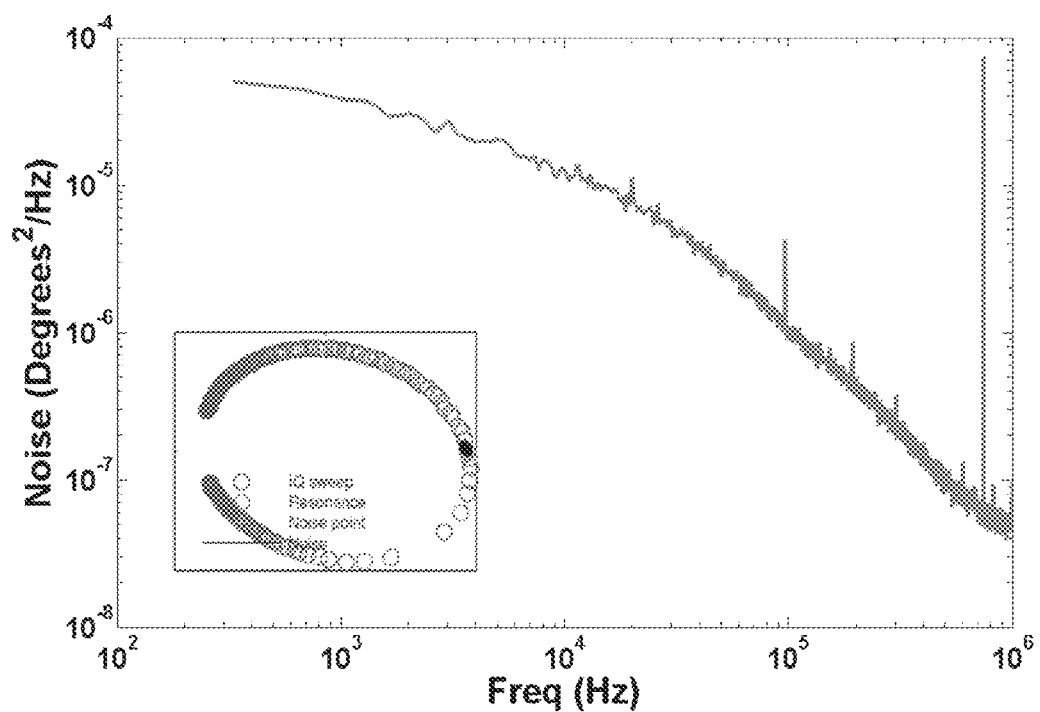
FIG. 7 illustrates the noise in one implementation in which the interdigitated capacitor is fabricated on the SiN layer.
Figure 8A:
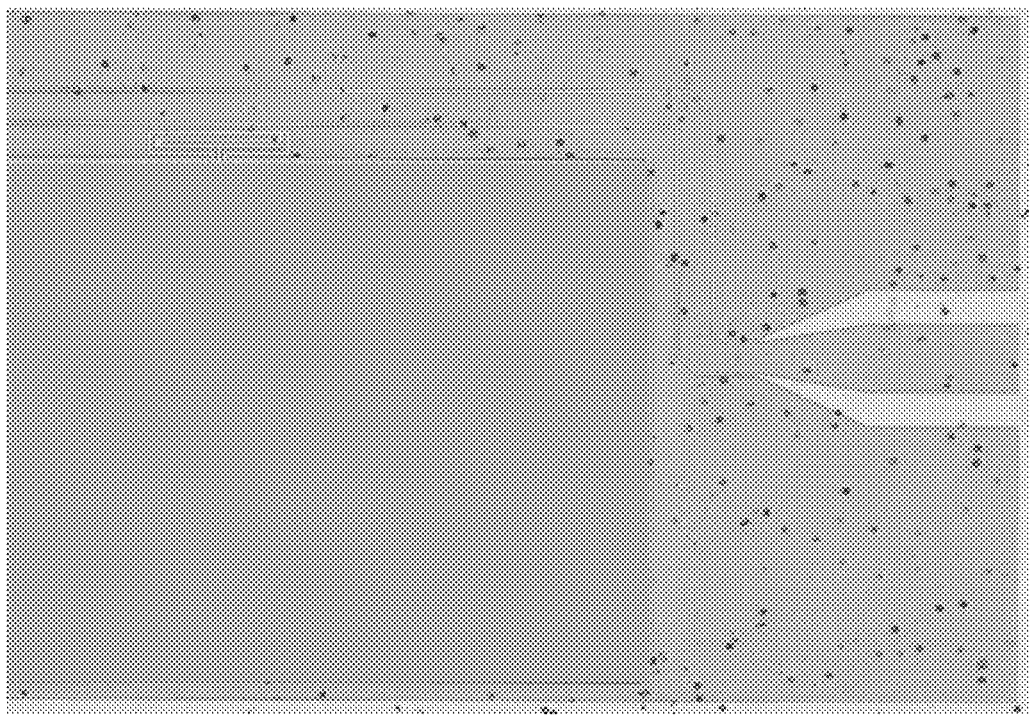
FIG. 8A-B illustrates an alternative implementation where SiN has been removed from under the interdigitated capacitor.
Figure 8B:
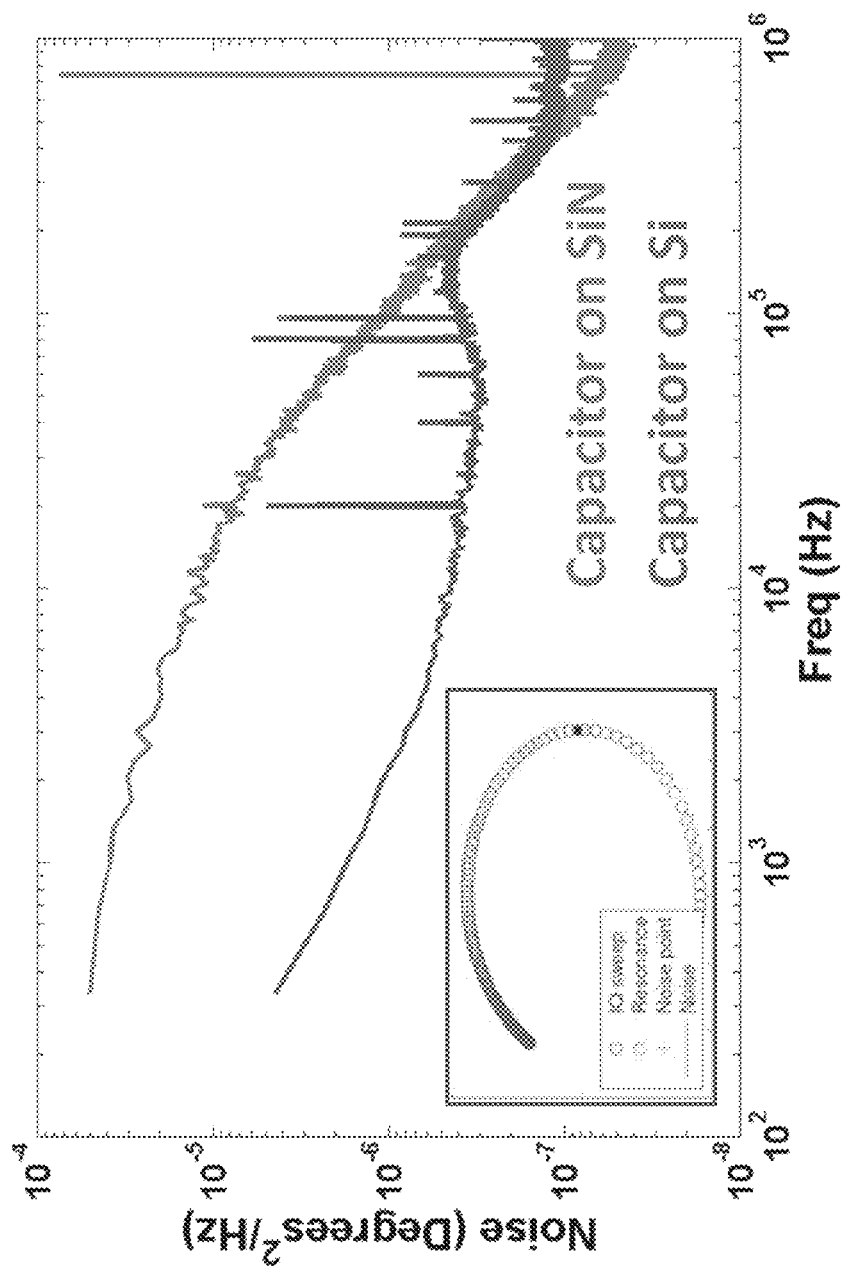

In one implementation, the devices are read out using a standard IQ mixer setup (FIG. 6A). A microwave signal with frequency set at, or near, the resonance frequency of the resonator is sent past the resonator via the microwave transmission line. The resonator alters the phase and amplitude of the microwave signal, and the changes in phase and amplitude are extracted using the IQ mixer. Each resonator coupled to the transmission line is designed to have a different resonant frequency. A microwave signal corresponding to each resonator is applied to the transmission line and read out using its own IQ mixer. In further implementations, the use of multiple microwave signal generators and IQ mixers will be replaced with software defined radio (FIG. 6B) (S. McHugh et al., "A readout for large arrays of microwave kinetic inductance detectors", Review of Scientific Instruments 83, 044702 (2012)).

These devices were illuminated with uncollimated X-ray photons of ≈6 keV from Fe-55 at different bath temperatures and the phase pulses from the resonators studied using a standard IQ mixing setup. When illuminated with X-ray photons the devices respond with a decrease of the resonance frequency and internal quality factor that can be seen as a pulse in both phase and amplitude directions. The amplitude pulses were typically smaller than the phase pulses. An analysis is presented using only the phase response.

Figure 2:
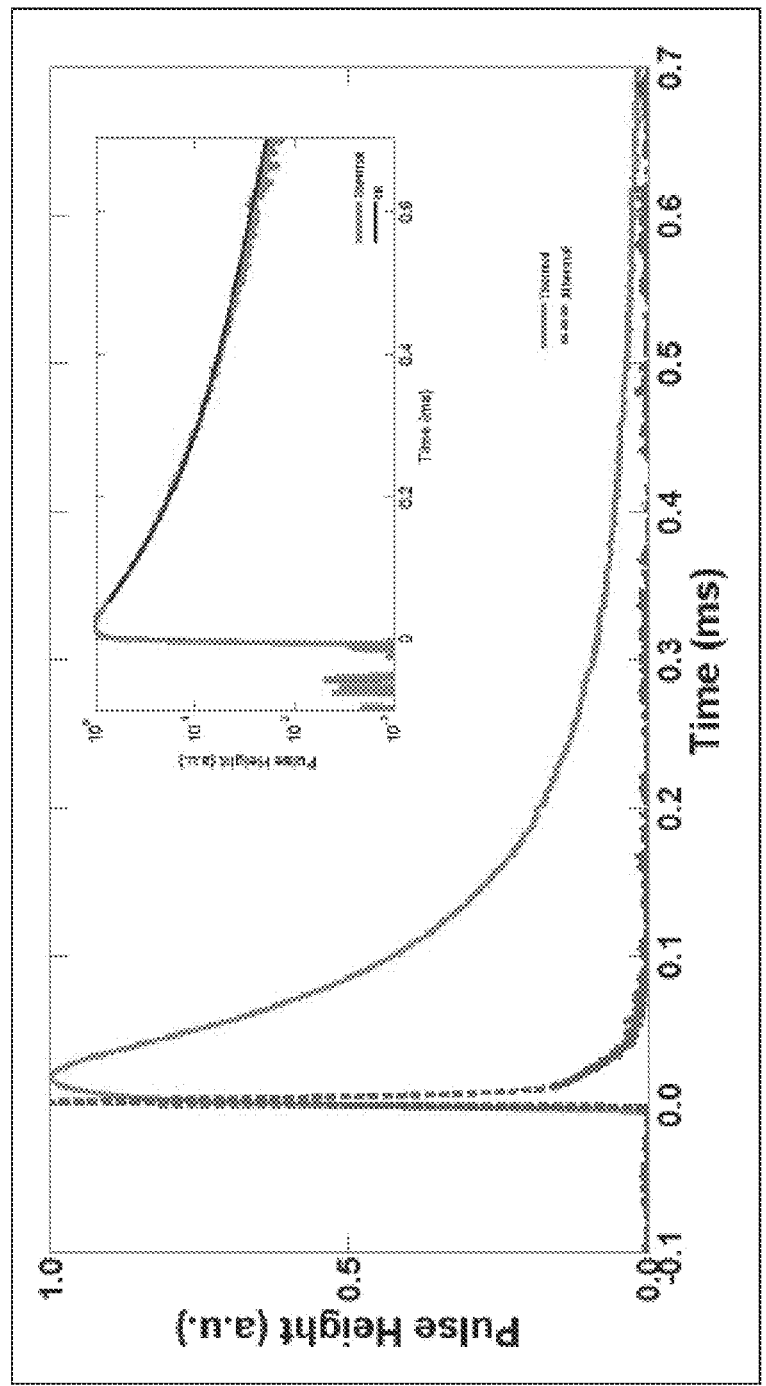
FIG. 2. Pulse templates obtained by averaging 20 pulses from 6 keV photons. The dashed curve represents the typical fast response for photon absorption directly in the resonator or in the SiN membrane. The solid curve represents the thermal response for photons absorbed in the tantalum absorber. The insert shows the thermal template fit with two exponentials.

Two classes of pulses were observed, both represented in FIG. 2. The blue solid line pulse is an athermal pulse similar to the typical pulses seen in other WSi2 resonators fabricated on thick silicon and sapphire substrates in which the resonator is in direct thermal contact with the thermal bath. This type of response is compatible with the expected non-equilibrium response for these energies for a given Q, kinetic inductance fraction, and volume. These pulses are attributed primarily to absorption of photons in the SiN membrane with subsequent generation of athermal phonons. These athermal phonons are energetic enough to generate a large number of non-equilibrium quasiparticles, which results in a large response and a very short decay time in WSi2. For the tantalum device on the perforated SiN membrane, these pulses have a second decay time, which is likely due to phonon trapping or thermalization in the SiN, given the very weak thermal link to bath. This second decay time is not seen in the athermal pulses from the gold devices on the continuous membrane. The fast portion of the pulse is compatible with the resonator response time of few μs ($\tau_{res}=Q/\pi fr$, Q≈104 and fr≈3 GHz), which indicates that the quasiparticle recombination time for WSi2 is probably much shorter. While this represents a disadvantage from the point of view of non-equilibrium resonators, where the quasiparticles will not live long enough to be properly sensed, it represents an advantage for thermal MKIDs, where the fast thermalization of the resonator should ensure the equilibrium of the resonator with the rest of the system (i.e., absorber and membrane) as well as suppress the generation-recombination noise inside the resonator bandwidth.

The longer pulse in FIG. 2 has never been seen in WSi2 resonators. The most significant difference is the much longer decay time, more than an order of magnitude longer than previously seen. In the gold devices on a continuous membrane, this type of pulse is much less frequent than the fast pulses: ≈10% for Gold-200 and ≈15% for Gold-300. Considering the comparable stopping power of gold and SiN at these thicknesses, these percentages are compatible with the ratio of absorber area to membrane area. Also, in the case of the device without any absorber only fast pulses were present. On the other hand, in the tantalum device with greater X-ray absorption efficiency (~25% at 6 keV) and substantially less SiN, the majority of the pulses are those with the much longer decay times. The gold devices are fit well to a single exponential decay while the tantalum devices are fit with a double exponential. These two exponentials are discussed below with regard to their dependence with bath temperature.

Figure 3:
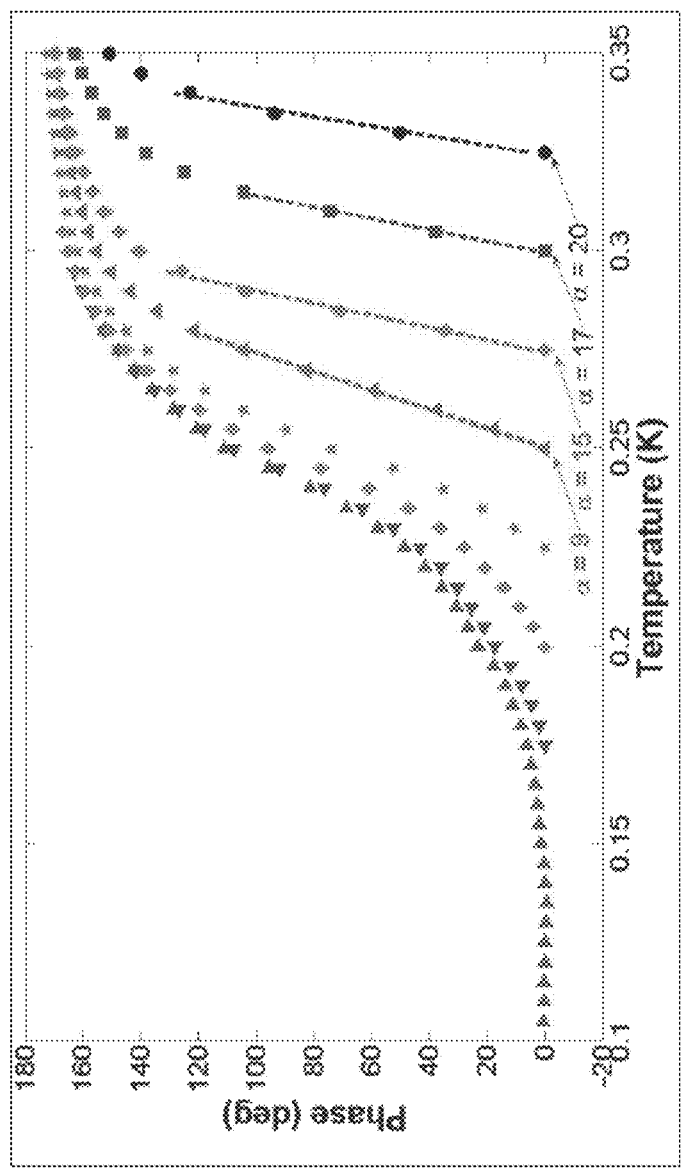
FIG. 3. Phase variation induced in the resonator by sweeping the cryostat temperature, starting at different bath temperatures (Tbath). These curves illustrate the responsivity (dθ/dT) and logarithmic sensitivity (αθ) of the detector system These data represent the calibration curves of the resonator as a thermometer relating the measured phase change to a temperature increase above the bath temperature.
Figure 4:
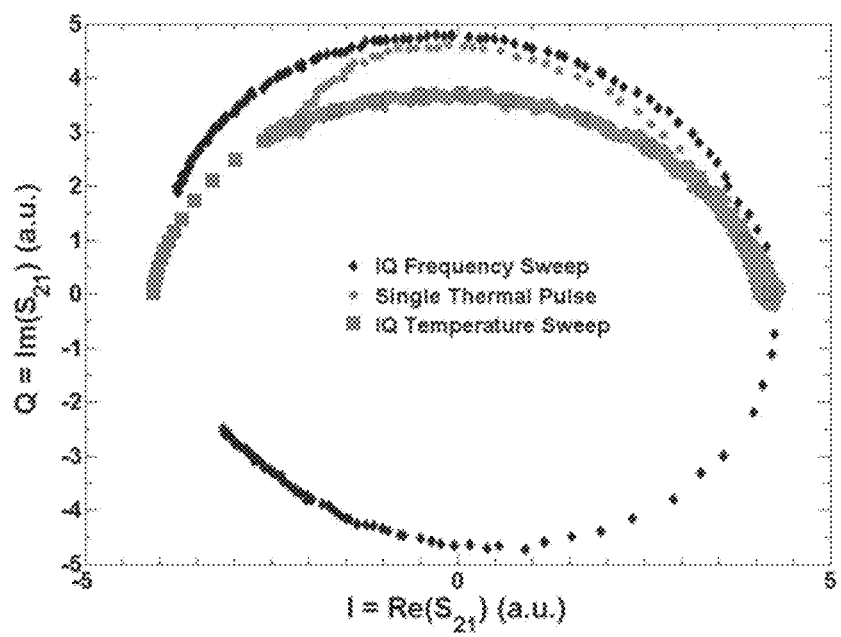
FIG. 4 illustrates the detector thermal response showing the static IQ frequency sweep (at constant temperature) in black and IQ temperature sweep (at constant frequency) in green. Overlaid is a single thermal pulse in red.
Figure 5:
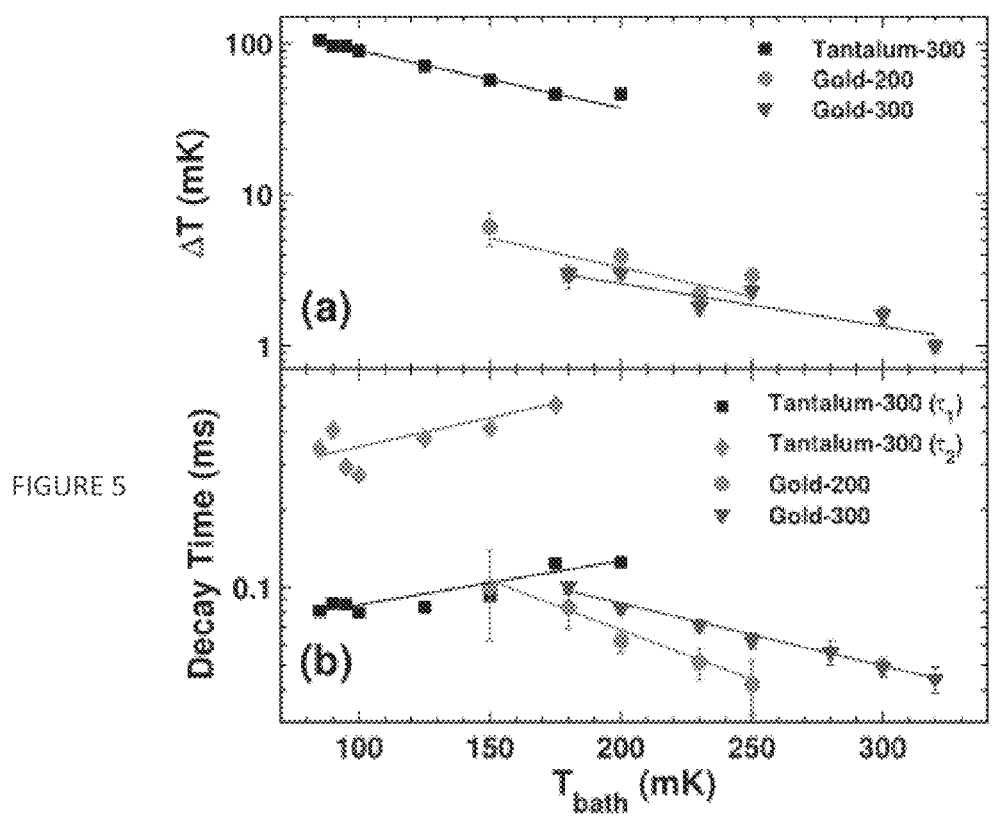
FIG. 5 illustrates the detector thermal response showing temperature rise (ΔT) induced in the resonator by the absorption of a 6 keV photon in a 100 nm thick Au absorber of 200 μm square (red circles), 300 μm square (blue triangle) and a 0.5 μm thick Ta absorber of 300 μm square (black square) at different Tbath. Note that the Au devices are on continuous membranes, while the Ta devices are on perforated membranes. Decay times of the thermal pulses at different Tbath for both Au and Ta absorbers. Red circles represent the 200 μm Au absorber, while blue triangles represent the 300 μm Au absorber one. For the Ta absorber, the two decay times present in the thermal pulses are shown for a single size absorber (300 μm side). The solid lines are guides for the eye.

To understand the nature of these long pulses, the detection mechanism behind a superconducting resonator needs to be considered. A superconductor in thermal equilibrium at a given bath temperature (Tbath) is characterized by a thermal population of quasiparticles and a corresponding resonance frequency and quality factor of the resonator. As the equilibrium temperature is changed, the changes in thermal quasiparticle populations are measured by the corresponding change in phase and amplitude of the microwave probe signal. This creates a calibration curve for the resonator acting as a thermometer. Calibration curves for a tantalum device taken at several different bath temperatures are shown in FIG. 3. Using a matched filter, the pulse height of the long decay pulses is estimated, and with the calibration curve, the induced temperature rise can be calculated at different Tbath for each device. The resulting temperature rises are shown in FIG. 5.

The temperature dependence of resonator relaxation or decay time can provide insights into the nature of the relaxation process. From Kaplan (Kaplan S B, Chi C C, Langenberg D N, Chang J J, Jafarey S and Scalapino D J, "Quasiparticle and phonon lifetimes in superconductors", 1976 Phys. Rev. B 14 4854), the relaxation time of non-equilibrium quasiparticles as a function of temperature is described by:

$$\tau_{rec} = \frac{\tau_0}{\sqrt{\pi}}\left(\frac{kT}{2\Delta}\right)^{5/2}\sqrt{\frac{T_e}{T}}\,e^{\Delta/kt} \quad (1)$$

The decay time of the device described herein deviates strongly from this function. Strikingly in FIG. 5, the decay times of the Ta device increase with bath temperature, which is a clear departure from Kaplan's quasiparticle recombination model, indicating the devices are operating in a thermal manner. This indicates that the resonator is responding to the absorption of an x-ray photon in a thermal equilibrium manner, as opposed to the generation of an excess of non-equilibrium quasiparticles by the absorption of photons directly in the resonator or the substrate or by the injection of quasiparticles in the resonator from a separate absorber in electrical contact. The results can be compared to the work of N. Vercruyssen et al (N. Vercruyssen, R. Barends, T. M. Klapwijk, J. T. Muhonen, M. Meschke, and J. P. Pekola, "Substrate-dependent quasiparticle recombination time in superconducting resonators", Appl. Phys. Lett. 99, 062509 (2011)), where they observed an enhancement in the recombination time of an aluminum coplanar waveguide resonator fabricated on a SiN membrane when illuminated directly with optical photons. Two distinct types of pulses are observed. While it is possible that there is an enhancement of the recombination time in the tungsten silicide resonator itself, this is probably still shorter than the resonator response time. The thermal relaxation in these devices seems to depend only on the heat capacity and the thermal conductance of the system. The silicon nitride membrane has provided a very weak thermal link to the bath, and it has enabled the thermal response of the superconducting resonators to be seen. However, this thermal behavior can also affect the response of resonators on solid substrates. This was pointed out in N. Vercruyssen et al., where they saw an enhancement in resonator decay time for aluminum resonators (Tc=1.1 K) on a solid SiN/Si substrate in the temperature range of 0.3 to 0.4 K, which is not explained by quasiparticle recombination. Likewise, de Visser et al., (de Visser P J, Baselmans J J A, Diener P, Yates S J C, Endo A and Klapwijk T M, "Number Fluctuations of Sparse Quasiparticles in a Superconductor", 2011 Phys. Rev. Lett. 106 167004) saw a similar enhancement of the resonator decay time in a similar temperature range for aluminum resonators on sapphire substrates illuminated with optical photons. Likely, this can be explained by considering the thermal behavior of the system.

Using resonators for X-ray detection is attractive given their straightforward multiplexing capabilities. Traditional non-equilibrium X-ray MKIDs requires superconducting absorbers with long quasiparticle diffusion lengths. This has limited the absorbers to narrow strips. Thermal MKIDs (i.e., TKID) offer more flexibility for the absorber both in terms of materials (i.e., normal and superconducting metals) and designs. The energy resolution of thermal MKIDs will be limited by thermodynamic fluctuations across the thermal weak links. In certain implementation of the devices, the absorber and resonator are not in direct contact, which will add an additional contribution to the thermodynamic fluctuations. However, it is conceivable to place the absorber and resonator in direct contact. In addition, superconducting resonators have excess phase noise, which can be mitigated by better choice of substrate (e.g., silicon membrane using silicon-on-insulator wafers) and design considerations. However, with an implementation of the currently described device, one can make an initial examination of the detector performance. Recently Lindeman et al. (M. A. Lindeman, P. Khosropanah, and R. A. Hijmering, "Model of Superconducting alternating current bolometers", J. Appl. Phys. 113, 074502 (2013).), have proposed a logarithmic sensitivity for an inductive thermometer:

$$\alpha\theta=(Qi+Qc)/(2*Qc)*(d\theta/dT)*T \quad (2)$$

where Qi is the internal quality factor of the resonator, and Qc in the coupling quality factor between the resonator and microwave feedline. The curves in FIG. 3 can be used to determine the sensitivity as a function of bath temperature for the tantalum device. At Tbath=175 mK, the sensitivity is $\alpha_\theta\approx 5$. While this sensitivity is smaller than that of a transition-edge sensor, it is comparable to semiconductor thermistors. Using a matched filter a histogram of pulse heights was created after applying a linear rise time-pulse height correction. The FWHM energy resolution of the Mn K$\alpha$ line is 90 eV at 175 mK, while the expected resolution given the pulse template and noise power spectrum is 44 eV. The capacitor for this device is on SiN, a source of two-level systems that causes increased phase noise, and it is anticipated that a reduction in noise and baseline resolution by removing the SiN under the capacitor. The FWHM resolution is likely limited by the position-dependent response in the tantalum absorber, a well-known issue with absorbers where the thermalization time is not negligible. In particular, the thermalization of superconductors, such as tantalum, is particularly slow and incomplete. A thin normal metal layer underneath the superconducting absorber can help with the thermalization. However, superconducting tin and semiconducting HgTe have successfully been used as x-ray absorbers using transition-edge-sensors and semiconductor thermistors, respectively. Moreover, if the distribution of the gradient of temperature from the absorber to the bath in the silicon nitride is not isotropic, the intrinsic current distribution in the meander portion of the resonator can degrade the resolution. It is expected to reduce the baseline noise level (i.e., phase noise) in future designs by removing the layer of SiN underneath the IDC and are pursuing design solutions to address systematic issues. In one implementation, a design with lower phase noise has been achieved by removing all of the SiN under the IDC and treating the underlying Si with an HF etch prior to depositing the resonator later. The HF etch is required to completely remove the native amorphous SiO2 layer than can form after removal of the SiN.

The absorber described for use with the device may be tantalum. In alternative embodiments, Ta, Sn, Bi, Au, Pb, W, WSi, HgCdTe, HgTe, or Si may be utilized. This absorber may be a film deposited using vacuum deposition system (sputtering or evaporation) or it can be formed from a bulk absorber that that is bonded to the thermal island via epoxy, bump-bonding or diffusion bonding.

In one implementation, the device may be fabricated as follows: 0.5 micrometer SiN on a 300 micrometer silicon wafer. The resonator is fabricated by deposition, lithography, then etch. A resist strip is provided. The absorber is fabricated by lithography, followed by deposition and liftoff. SiN bridge lithography is performed with backside SiN membrane lithography and backside Silicon etch. Then a protective coating of Al is deposited on the backside. The SiN bridge is etched and an Al wet etch performed. Finally, a resist strip.

The main source of noise in kinetic inductance detectors using phase readout (phase signals are larger than amplitude) is noise from two level systems (TLS). This noise source acts as a variable dielectric constant in amorphous dielectrics. Because the resonator frequency is dependent on the dielectric constant, a varying dielectric constant leads to a varying resonant frequency (the signal in a KID). There are several ways to reduce the effect of TLS noise. The first approach is to remove the SiN layer underneath the capacitors of the resonators. The TLS noise is greatest in areas of large electric field, such as around the capacitors. The SiN layer is present in the device as the membrane providing thermal isolation. However, it is not necessary for this layer to be under the capacitors. Another means of reducing the effect TLS noise is to alter the design of the capacitors. Interdigitated capacitors with wider fingers and larger finger-to-finger spacing have been shown to have lower TLS noise. Ultimately, if these two methods are not successful it may be necessary to completely remove the SiN layer, and fabricated the detector using a thinned crystalline silicon membrane (e.g., using silicon-on-insulator wafers) for the thermal isolation. Similar devices have been made, but are slightly more complicated to fabricate.

The TLS noise level is sensitive to the drive power present at the resonator in addition to the temperature. As such, altering the resonator design (via materials choice, coupling factor, etc.) in order to increase the power level present at the detector may aid in lowering the TLS noise level.

Aside from altering the detector design, the operating condition of the detector impacts the noise level. At low temperatures, the TLS noise is the dominant noise source. However, as the devices operating temperature increases, the two level systems become saturated, and the TLS noise level decreases. The overall detector noise level should decrease with temperature up to the point at which the thermal fluctuation, or phonon, noise becomes comparable to the TLS noise. At temperatures above this transition, the phonon noise with be the dominant noise source. It may therefore be desirable to operate the detector at the temperature point where the TLS and phonon noise sources are equivalent to yield the lowest overall noise level.

In further implementations, the decoupling between the absorber and resonator may be increased. In another implementation the IDC can be made larger, with wider fingers and larger gaps between fingers to reduce TLS nose. In another implementation the inductor does not encircle the absorber, but stretches along one side of the absorber. This implementation can limit sensitivity of the device to photon absorption position dependence. In another implementation, normal metals (or other high thermal conductivity material) is placed alongside or underneath the absorber to improve thermalization of the absorber. In another implementation the inductor and capacitor are made of different materials to yield an inductor with greater temperature sensitivity and a capacitor with lower TLS noise.

As described herein, a superconducting resonator was fabricated and characterized with X-ray photons that bases its detection mechanism on the measurement of temperature variation induced by photon absorption in gold and tantalum absorbers. In this approach, the quasiparticle population in the resonator remains in thermal equilibrium with the SiN membrane, as opposed to the traditional MKID detection mechanism where an excess of non-equilibrium quasiparticles in the resonator is measured. In addition the decay time of the pulses from WSi2 resonators has been increased by more than an order of magnitude. It has been shown that one can control the decay time by changing the thermal properties of the device, such as the heat capacity and the thermal conductance, rather than a resonator material-dependent property (i.e. quasiparticle lifetime). With improvements to the device design, thermal MKIDs may provide a new route for X-ray detectors.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A thermal kinetic inductance device for x-ray detection, comprising:
    a superconducting inductor with thermally variable inductance thermally isolated from a heat bath;
    an x-ray absorber in thermal contact with the inductor via an energy mediating layer;
    a capacitor in electrical communication with the superconducting inductor;
    wherein the capacitor and the superconducting inductor forming a resonant circuit and the superconducting inductor configured to undergo an inductance change from thermal energy from the x-ray absorber.

2. The thermal kinetic inductance device of claim 1, further comprising a feedline electromagnetically coupled to the inductor.

3. The thermal kinetic inductance device of claim 1, wherein capacitor comprises material selected from the group consisting of Al, Nb, WSi, Ta, TaN, TiN, NbTiN, MoGe.

4. The thermal kinetic inductance device of claim 1, wherein inductor comprises material selected from the group consisting of Al, Nb, WSi2, Ta, TaN, TiN, NbTiN, MoGe.

5. The thermal kinetic inductance device of claim 1, wherein x-ray absorber comprises material selected from the group consisting of Bi, Au, Pb, HgCdTe, HgTe, Si.

6. The thermal kinetic inductance device of claim 1, further comprising material forming an island about the x-ray absorber and extending beyond the loop of the inductor.

7. The thermal kinetic inductance device of claim 1, further comprising a thinned portion of the substrate between fingers of the capacitor.

8. The thermal kinetic inductance device of claim 1, wherein the ΔE is less than 10 eV and count rate is greater than 10 kcps.

9. The thermal kinetic inductance device of claim 1, wherein a SiN layer thermally isolates the superconducting inductor.

10. The thermal kinetic inductance device of claim 1, wherein the superconducting inductor is thermally isolated by a thinned crystalline silicon membrane.

11. An apparatus for x-ray detection comprising:
a thermal kinetic inductance device;
a cryostat with operating temperature near 0.1 K
a microwave synthesizer;
a low noise amplifier;
a plurality of IQ mixers;
a digitizer; and
variable attenuators.

12. The apparatus of claim 11, wherein the thermal kinetic inductance device comprises:
a superconducting inductor with thermally variable inductance thermally isolated from a heat bath;
an x-ray absorber in thermal contact with the inductor via an energy mediating layer;
a capacitor in electrical communication with the superconducting inductor;
wherein the capacitor and inductor forming a resonant circuit.

13. The apparatus of claim 11 wherein the thermal kinetic inductance device further comprises a feedline electromagnetically coupled to the resonator.

14. The apparatus of claim 11 wherein the capacitor comprises material selected from the group consisting of Al, Nb, WSi, Ta, TaN, TiN, NbTiN, MoGe.

15. The apparatus of claim 11 wherein the inductor comprises material selected from the group consisting of Al, Nb, WSi2, Ta, TaN, TiN, NbTiN, MoGe.

16. The apparatus of claim 11 wherein the x-ray absorber comprises material selected from the group consisting of Ta, Sn, Bi, Au, Pb, W, WSi, HgCdTe, HgTe, Si.

17. The apparatus of claim 11 wherein the thermal kinetic inductance device further comprises material forming an island about the x-ray absorber and extending beyond the loop of the inductor.

18. The apparatus of claim 11 wherein the thermal kinetic inductance device further comprises a thinned portion of the substrate between fingers of the capacitor.

19. The apparatus of claim 11 wherein the ΔE is less than 10 eV and count rate is greater than 10 kcps.

20. A method for fabricating a thermal kinetic inductance detector comprising:
fabricating a micrometer SiN membrane on a Silicon wafer;
fabricating a resonator by deposition, lithography, then etch;
fabricating a resist strip;
fabricating an absorber by lithography, followed by deposition and liftoff;
creating a SiN bridge via lithography with backside SiN membrane lithography and backside Silicon etch;
depositing a protective coating of Al; and
etching the SiN bridge.

* * * * *